US006054510A

United States Patent [19]
Willett et al.

[11] Patent Number: 6,054,510
[45] Date of Patent: Apr. 25, 2000

[54] BIODEGRADABLE FORMED ARTICLE

[75] Inventors: Julious L. Willett; William M. Doane, both of Morton, Ill.; Wayne Xu, Montgomery, Ohio; Michael N. Mang, Midland, Mich.; Jerry E. White, Lake Jackson, Tex.

[73] Assignees: The United States of America as represented by the Secretary of the Agriculture, Washington, D.C.; Biotechnology Research and Development Corporation, Peoria, Ill.

[21] Appl. No.: 09/150,963

[22] Filed: Sep. 10, 1998

Related U.S. Application Data

[62] Division of application No. 08/804,376, Feb. 21, 1997, Pat. No. 5,852,078
[60] Provisional application No. 60/013,526, Feb. 28, 1996.

[51] Int. Cl.⁷ ............... C08L 63/00; C08L 63/02; C08L 67/02; C08L 71/00
[52] U.S. Cl. .................. 524/35; 524/47; 524/50; 524/51; 524/55; 264/109; 264/176.1; 264/217; 264/638; 264/639
[58] Field of Search ................... 524/35, 47, 50, 524/51, 55; 264/638, 639, 109, 176.1, 217

[56] References Cited

U.S. PATENT DOCUMENTS

| | | |
|---|---|---|
| 3,149,085 | 9/1964 | Ball et al. . |
| 3,850,862 | 11/1974 | Clendinning et al. . |
| 3,901,838 | 8/1975 | Clendinning et al. . |
| 3,921,333 | 11/1975 | Clendinning et al. . |
| 3,923,729 | 12/1975 | Clendinning et al. . |
| 3,931,068 | 1/1976 | Clendinning et al. . |
| 3,932,319 | 1/1976 | Clendinning et al. . |
| 3,949,145 | 4/1976 | Otey et al. . |
| 4,016,117 | 4/1977 | Griffin . |
| 4,344,857 | 8/1982 | Shasha et al. . |
| 4,483,950 | 11/1984 | Fanta et al. . |
| 4,863,655 | 9/1989 | Lacourse et al. . |
| 4,873,270 | 10/1989 | Aime et al. . |
| 4,911,952 | 3/1990 | Doane et al. . |
| 4,983,651 | 1/1991 | Griffin . |
| 5,095,054 | 3/1992 | Lay et al. . |
| 5,171,820 | 12/1992 | Mang et al. . |
| 5,183,690 | 2/1993 | Carr et al. . |
| 5,185,382 | 2/1993 | Neumann et al. . |
| 5,186,990 | 2/1993 | Starcevich . |
| 5,212,219 | 5/1993 | Griffin ..................... 524/17 |
| 5,219,646 | 6/1993 | Gallagher et al. . |
| 5,234,977 | 8/1993 | Bastioli et al. . |
| 5,252,271 | 10/1993 | Jeffs . |
| 5,256,711 | 10/1993 | Tokiwa et al. . |
| 5,272,181 | 12/1993 | Boehmer et al. . |
| 5,292,782 | 3/1994 | Bastioli et al. . |
| 5,321,064 | 6/1994 | Vaidya et al. . |
| 5,346,936 | 9/1994 | Buehler et al. . |
| 5,360,830 | 11/1994 | Bastioli et al. . |
| 5,384,187 | 1/1995 | Uemura et al. . |
| 5,391,423 | 2/1995 | Wnuk et al. . |
| 5,412,005 | 5/1995 | Bastioli et al. . |
| 5,422,387 | 6/1995 | Toms et al. . |
| 5,439,953 | 8/1995 | Ritter et al. . |
| 5,446,078 | 8/1995 | Vidya et al. . |
| 5,459,258 | 10/1995 | Merrill et al. . |
| 5,462,983 | 10/1995 | Bloembergen et al. . |
| 5,496,910 | 3/1996 | Mang et al. . |
| 5,510,401 | 4/1996 | Dehennau et al. . |
| 5,574,076 | 11/1996 | Sharak et al. . |
| 5,583,187 | 12/1996 | Sharak et al. . |
| 5,665,786 | 9/1997 | Xu et al. ................... 521/84.1 |

FOREIGN PATENT DOCUMENTS

| | | |
|---|---|---|
| 0513679 | 11/1992 | European Pat. Off. . |
| 0535994 | 4/1993 | European Pat. Off. . |
| 0667369 | 8/1995 | European Pat. Off. . |
| 2735483 | 6/1995 | France . |
| 4411051 | 3/1994 | Germany . |
| 5-320326 | 12/1993 | Japan . |
| 90/01043 | 3/1990 | WIPO . |
| 92/02363 | 2/1992 | WIPO . |
| 93/00399 | 1/1993 | WIPO . |
| 93/11937 | 7/1993 | WIPO . |
| 93/14911 | 9/1993 | WIPO . |
| 96/03454 | 7/1995 | WIPO . |
| 97/23564 | 7/1997 | WIPO . |

OTHER PUBLICATIONS

Koenig et al., "Biodegradable Polymer/Starch Blends, Composites, and Coatings," *PMSE*, 67, pp. 290–291 (1992).

Kotnis et al., "Processing and Mechanical Properties of Biodegradable Poly(hydroxybutyrate–co–valerate)–Starch Compositions," *J. Environ. Polymer Degradation*, 3:2, pp. 97–105 (1995).

Lim et al., "Effect of Starch Granule Size on Physical Properties of Starch–Filled Polyethylene Flm," *Biotechnol. Prog.*, 8, pp. 51–57 (1992).

Mang et al., "Synthesis and Properties of Thermoplastic Hydroxy–Functional Polyesters Derived from Diacids and Diglycidyl Ethers," *Polymer Preprints*, pp. 180–181 (1995).

Ramsay et al., "Biodegradability and Mechanical Properties of Poly(β–Hydroxybutyrate–Co–β–Hydroxyvalerate)–Starch Blends," *Applied and Environmental Microbiology*, 59:4, pp. 1242–1246 (Apr. 1993).

Shogren et al., "Development of Starch Based Plastics—A Reexaminiation of Selected Polymer Systems in Historical Perspective," *Starch/Stärke*, 45:8, pp. 276–280 (1993).

(List continued on next page.)

*Primary Examiner*—Nathan M. Nutter
*Attorney, Agent, or Firm*—Majestic, Parsons, Siebert & Hsue

[57] ABSTRACT

Compositions of the invention include a hydroxy-functional polyester and a natural polymer. Articles can be made from such a composition so as to have sufficiently strong tensile strengths as to form disposable utensils or to have sufficient stretchability so as to form thin wrap films. However, the compositions are more environmentally friendly than commodity plastics such as polyethylene or polystyrene. Granular starches derived from a grain, a root, a legume, or mixtures thereof, are particularly preferred as the natural polymers for inclusion in the compositions.

22 Claims, 2 Drawing Sheets

OTHER PUBLICATIONS

Tatarka, Paul D., "Can Agricultural Materials Compete with Expanded Polystyrene in the Loose–Fill Market?," The Plastics Challenge—A Revolution in Education, Proceedings of the SPE 53$^{rd}$ Annual Technical Conference and Exhibits, pp. 2225–2231 (1995).

Union Carbide's "Material Safety Data Sheet" containing information on Additives, e.g. nomeclature and structure (Oct. 31, 1994).

Shogren, R.L., "Poly(ethylene oxide)–Coated Granular Starch–Poly(hydroxybutyrate–co–hydroxyvalerate) Composite Materials," *J. Environ. Polymer Degradation*, 3:2, pp. 75–80 (1995).

Tiefenbacher, Karl F., "Starch–Based Foamed Materials—Use and Degradation Properties," *J.M.S.—Pure Appl. Chem.*, A30(9&10), pp. 727–731 (1993).

Westhoff et al., "Starch–Polyvinyl Alcohol Films—Effects of Various Plasticizers," *Starch–Stärke*, 31, pp. 163–165 (1979).

Lawton & Fanta, "Glycerol–Plasticized Films Prepared from Starch—Poly(vinyl alcohol) Mixtures: Effect of Poly-(ethylene–co–acrylic Acid)," *Carbohydrate Polymers*, 23, pp. 275–280 (1994).

McCarthy et al., "Recent Advances in Biodegradable Polymers and Blends," Corn Utilization Conference VI, St. Louis, Missouri, Jun. 4–6, 1996.

Shogren et al., "Biodegradable Starch–Polyester Composites," Corn Utilization Conference VI, St. Louis, Missouri, Jun. 4–6, 1996.

Abstract of JP 05320326–A, Dec. 3, 1993, as found in Database WPI, Week 9402, Mar. 16, 1994, AN 94–012391/02.

Fritz et al., "Der Einsatz von Stärke bei der Modifizierung synthetischer Kunststoffe," *Starch/Stärke*, 45(9), pp. 314–322 (1993).

Swanson et al., "Skin and Layer Formation in Films Prepared from Carbohydrates, Poly(ethylene–co–acrylic acid), and Polyethylene," *J. of Applied Polymer Science*, 49(10), pp. 1683–1693 (Sep. 10, 1993).

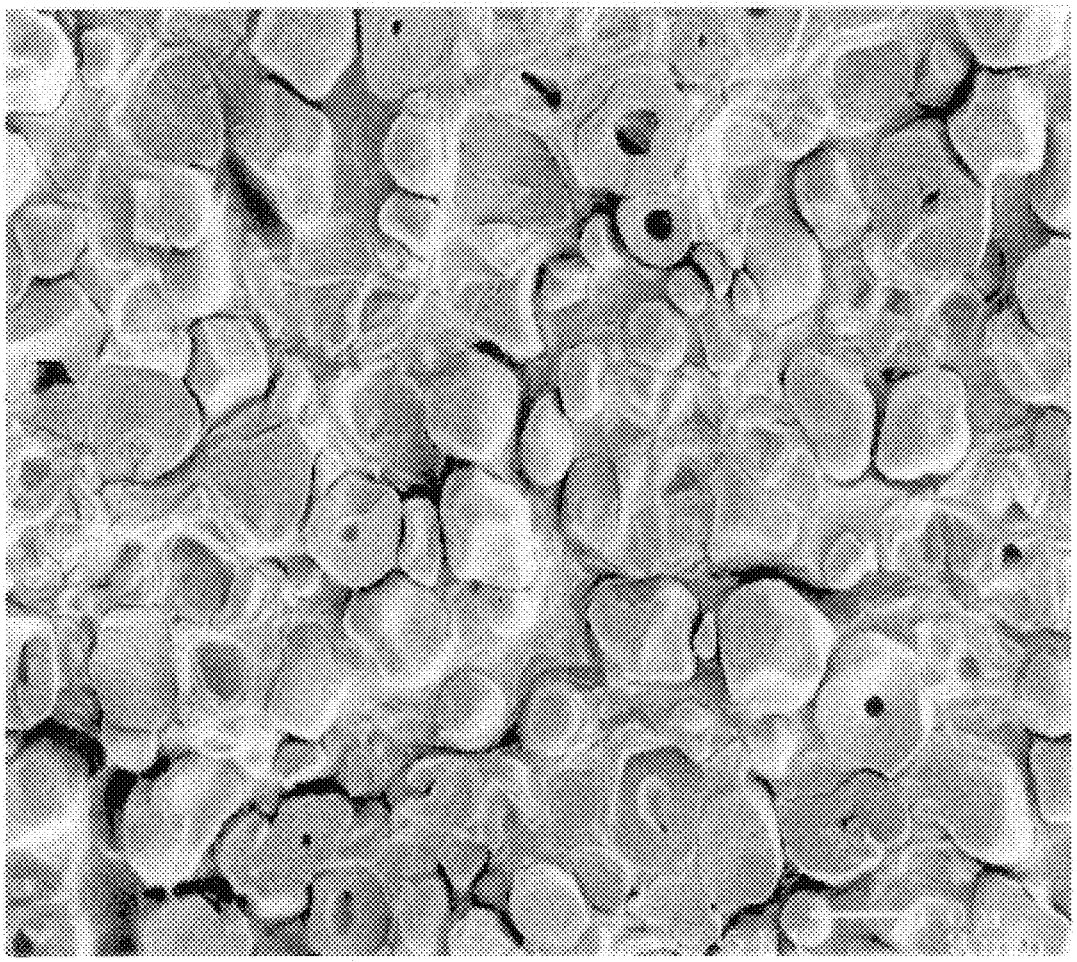
FIG._1

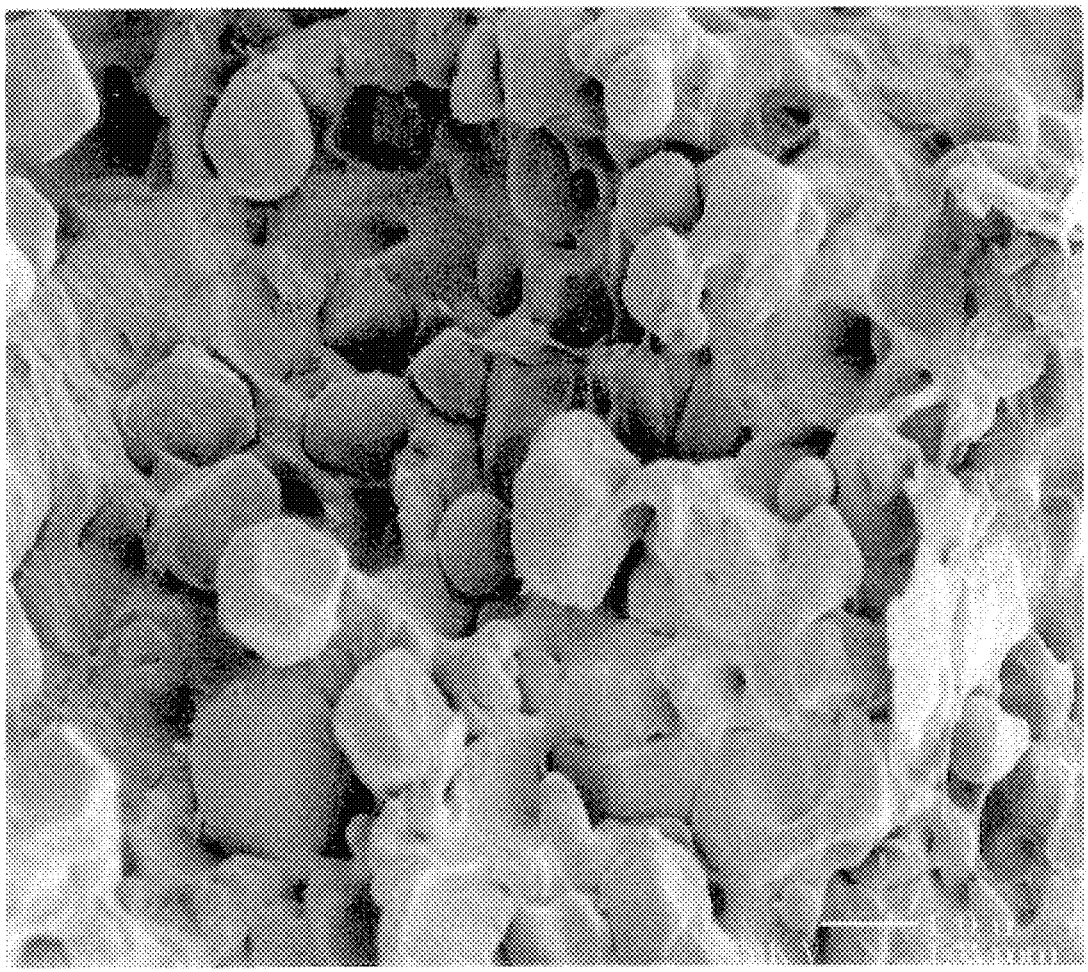
FIG._2

BIODEGRADABLE FORMED ARTICLE

This is a division of application Ser. No. 08/804,376, filed Feb. 21, 1997, and now U.S. Pat. No. 5,852,078 which claims priority from provisional application Ser. No. 60/013,526, filed Feb. 28, 1996.

FIELD OF THE INVENTION

The present invention generally relates to compositions useful for forming articles by means such as thermoplastic processing (e.g., molding, extrusion and casting), and more particularly relates to hydroxy-functional polyester containing compositions. Articles with good mechanical properties, such as tensile strength and/or tensile elongation, can be made with such polyesters in combination with natural polymers. Such articles are biodegradable and have a reduced cost of manufacture due to the inclusion of a low cost natural polymer, such as starch.

This invention was made with government support under Grant Agreement number 59-3K95-3-126 awarded by the United States Department of Agriculture, Agricultural Research Services. The government has certain rights in this invention.

BACKGROUND OF THE INVENTION

Starches and modified starches have been the focus of considerable research interest in attempts to use these as fillers in order to decrease polymer costs and to use polymers that are biodegradable. As several recent examples, U.S. Pat. No. 5,384,187, issued Jan. 24, 1995, inventors Uemura et al., U.S. Pat. No. 5,391,423, issued Feb. 21, 1995, inventors Wnuk et al., and U.S. Pat. No. 5,412,005, issued May 2, 1995, inventors Bastioli et al., all represent domestic and foreign based attempts to achieve biodegradable polymer compositions in which natural polymers such as starches have been added to synthetic polymers. Unfortunately, while the inclusion of starches can reduce costs, the mechanical properties of the synthetic polymer can be so adversely affected by inclusion of starch as to vitiate the cost advantages.

Among examples of physical strength loss when starch is blended with various synthetic polymers are those described in several recent articles. Thus, for example, Koenig and Huang, *TMSE*, 67, pp. 290–291 (1992) used three different types of synthetic polymers in combination with starch and starch derivatives and reported their properties. When polycaprolactone ("PCL") was filled with 25 wt. % starch or a starch derivative the yield strength and the tensile strength were reduced by half.

Ramsay et al., *Applied and Environmental Microbiology*, 59, pp. 1242–1246 (1993) studied poly-β-hydroxyalkanoates with starch. The biodegradable polymer [P(HB-co-HV)] was said to hold biodegradable promise, but the polymer is significantly higher in price than a commodity plastic such as polyethylene or polystyrene. The inclusion of 25 wt. % granular starch was reported to result in a composition with a tensile strength of about 60% the original (16 MPa by contrast to 27 MPa). The authors acknowledged that the use of unmodified granular starch as a particulate filler in the [P(HB-co-HV)] polymer reduced the tensile strength and did not offer any appreciable reinforcement in the mechanical rigidity, presumably due to poor adhesion of the polymer granule interface. The authors concluded it would be necessary to develop formulations with improved adhesion.

Accordingly, attempts continue to find synthetic polymer based compositions that can be formed into articles, such as for example disposable plastic utensils or stretchable thin films for food packaging purposes, that are reasonably competitive in price with commodity plastics such as polyethylene or polystyrene, but which are more environmentally friendly.

SUMMARY OF THE INVENTION

The present invention has several embodiments that solve the problems discussed above.

In one aspect of the present invention, a formed article comprises a continuous synthetic polymer phase and a discontinuous natural polymer phase. The synthetic polymer phase includes a hydroxy-functional polyester that is surprisingly compatible with the natural polymer phase.

Articles of this embodiment can be formulated so as to have a tensile strength above about 20 MPa (sufficiently strong for example, so as to form disposable utensils) or to have a tensile elongation above about 200% (sufficient stretchability, for example, so as to form thin wrapping films). With one particularly preferred embodiment, a composition is provided with 45 wt. % starch granules (derived from corn) having an elongation of about 500%. In another particularly preferred embodiment, a composition is provided with 60 wt. % starch granules (derived from corn) having a tensile strength of about 22 MPa.

The hydroxy-functional polyesters with which inventive compositions and articles may be formed by inclusion of natural polymer granules show a remarkable compatibility with natural polymers. This is illustrated by tests showing that inclusion of small amounts of granular starch into several hydroxy-functional polyesters actually increases the tensile strength of the hydroxy-functional polyester. Another example of the remarkable compatibility of the hydroxy-functional polyesters and granular starch is shown in instances where inclusion of plasticizer actually leads to moderately improved tensile strength although presence of plasticizer in other polymer compositions typically softens such compositions.

Compositions of the invention are useful for formed articles, particularly by thermoforming techniques such as molding, extrusion and casting, and preferably comprise a hydroxy-functional polyester, such as a poly(hydroxyester) or a poly(hydroxyester ether), admixed with starch or modified starch granules derived from a grain, a root, a legume, a tuber, or mixtures thereof. By "modified" is meant that the starch can be derivatized or modified by typical processes known in the art (e.g. esterification, etherification, oxidation, acid hydrolysis, cross-linking and enzyme conversion). Thus, for example, a modified starch may be a starch ester, a starch ether, or a crosslinked starch. Conventional modifications of starch are described in publications such as *Starch: Chemistry and Technology*, 2d edition, editor Whistler et al., and *Starch Derivatives: Production and Uses*, Rutenberg et al., Academic Press, Inc. 1984.

The granules preferably have less than about 15 wt. % water and preferably have a particle size of less than about 50 µm.

In addition to the two essential components of hydroxy-functional polyester and natural polymer, compositions of the invention can optionally include various additional materials, such as for example plasticizers, and filler materials, such as for example cellulose, vegetable fibers, calcium carbonate, talc, etc.

Other advantages and aspects of the present invention will become apparent upon reading the specification and the appended claims.

BRIEF DESCRIPTION OF THE DRAWINGS

FIG. 1 is a scanning electron micrograph of one inventive embodiment at a magnification of 1000; and FIG. 2 is another scanning electron microgram of another inventive embodiment, but again at a magnification of 1000, and was made following an elongation test.

DETAILED DESCRIPTION OF THE PREFERRED EMBODIMENTS

Broadly, the present invention comprises a composition consisting essentially of two essential components: the first component is an hydroxy-functional polyester, and the second component is a natural polymer. The natural polymer is Data provided by the Dow Chemical Company (manufacturer of hydroxy-functional polyesters such as described by U.S. Pat. No. 5,171,820) indicates the biodegradable nature of these polymers through the ability of various soil bacteria (such as *Pseudomonas putida*) to use the synthetic polymers as a substrate for cell culture growth.

Representative structures for suitable hydroxy-functional polyesters in practicing this invention are preferably represented by Formula A (where n provides a sufficient molecular weight, such as for example a m.w. of about 50,000–100,000). Higher molecular weights are preferred due to higher strength.

FORMULA A

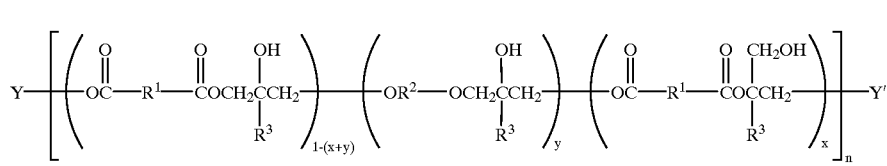

preferably in the form of granules derived from starch or a derivatized (modified) starch, but can also be granules of other natural polymers (e.g. guar gum, cellulose and the like). Granules should have a particle size of less than about 100 μm, and preferably have a particle size of up to 50 μm and a water content of less than about 15 wt. %, more preferably less than about 10 or 11 wt. %.

These two essential components are admixed in varying amounts. The natural polymer may be present in a trace amount or in greater amounts up to a weight ratio with respect to the hydroxy-functional polyester of about 8:1, more preferably up to about 6:1. Each of the components suitable for preparing compositions of the invention will now be more fully described.

Suitable Hydroxy-Functional Polyesters

In Formula A each of $R^1$ and $R^2$ is individually a divalent organic moiety which is predominately hydrocarbon, each $R^3$ is individually hydrogen or lower alkyl, y is a fraction from 0 to 0.5 and x is a fraction from about 0.05 to about 0.4. Typically Y is hydrogen or glycidyl and Y' is glycidyl arylene ether, glycidyl alkyene ester, glycidyl alkylene ether or glycidyl arylene ester.

Thus, suitable polyesters have repeating units represented by Formula B (where each of $R^1$, $R^2$, $R^3$, x, and y are as defined above).

FORMULA B

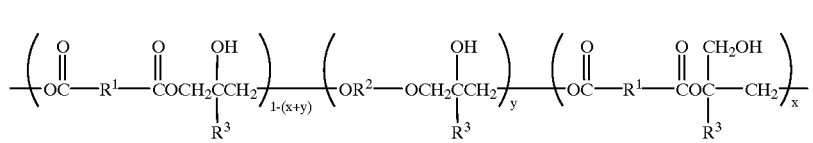

Useful hydroxy-functional polyesters for this invention may be prepared from base-catalyzed nucleophilic addition of suitable acids to epoxies, which reaction generates both an ester linkage and a pendent hydroxyl group. Transesterification and cross linking reactions are eliminated through use of quaternary ammonium halide salts as initiators for the reaction of diacids with diglycidyl ethers, providing convenient preparation of high molecular weight, thermoplastic, hydroxy-functional polyesters in ether solvents at temperatures from 80° C.–160° C. The preparation and structures for such hydroxy-functional polyesters suitable in practicing this invention may be as described by U.S. Pat. No. 5,171,820, inventors Mang and White, issued Dec. 15, 1992, which is hereby incorporated in its entirety by reference.

Particularly preferred such polyesters are prepared from diglycidyl esters of an aliphatic diacid such as adipic due to the ready availability and reasonable price for adipic acid as a source of reactant. Other particularly preferred polyesters may be prepared from dihydric phenols, such as hydroquinone.

Four particularly preferred hydroxy-functional polyesters, used extensively to illustrate (but not to limit) the present invention, are sometimes hereinafter designated "BIS CHD," "BIS Adipic," "HQ DDCA" and "BIS DDCA." Repeating unit structures for these four illustrative hydroxy-functional polyesters are illustrated by Formulas C–F and several of their properties of interest for the invention are summarized in Table A.

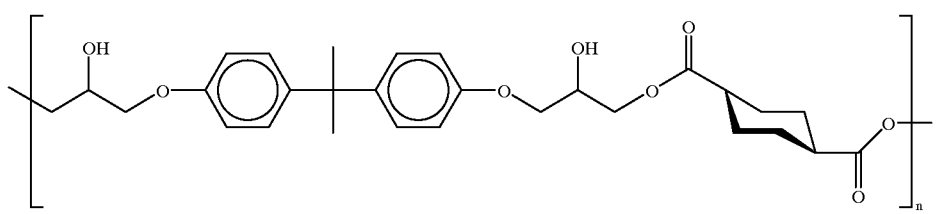

FORMULA C

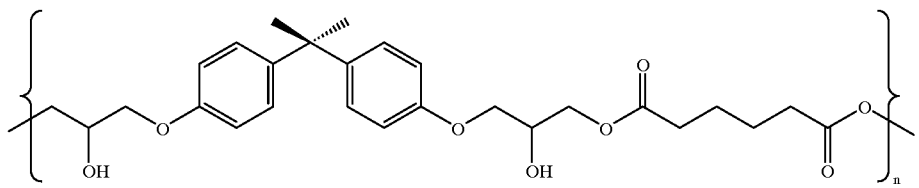

FORMULA D

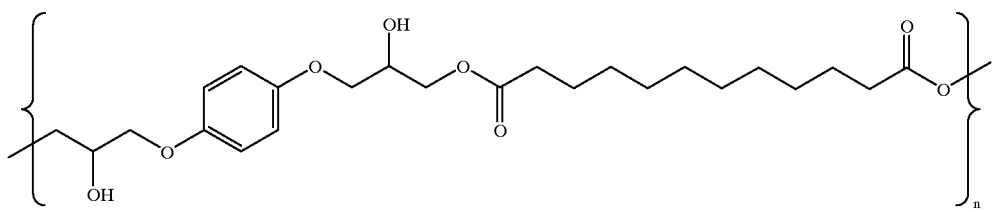

FORMULA E

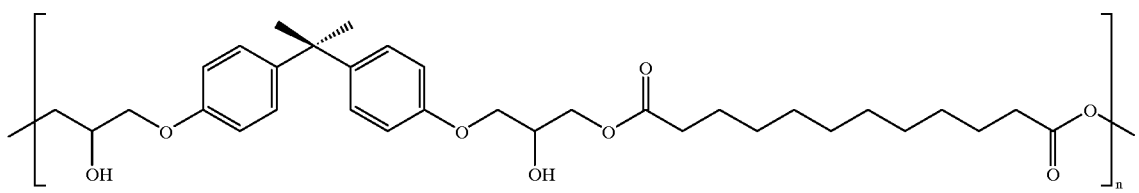

FORMULA F

In the Formulas C–F, "n" preferably is as earlier described.

TABLE A

| Hydroxy-Functional Polyester Components | Tg(°C.) | Tensile Strength (MPa) | % Elongation |
|---|---|---|---|
| BIS CHD | 66 | 60–61 | 172 |
| BIS Adipic | 45 | 12 | 157 |
| HQ DDCA | 10 | 14 | 612 |
| BIS DDCA | 20 | 1.2 | 487 |

With reference to the data of Table A, one sees that two of the hydroxy-functional polyesters used to illustrate this invention have a quite high percentage elongation property (HQ DDCA and BIS DDCA). Thus, one would tend to choose one of these (or another with a relatively high percentage elongation property) when one wished to formulate an embodiment of the invention that had high percent elongation. Similarly, if one wished to formulate an inventive embodiment with outstanding tensile strength, a hydroxy-functional polyester such as BIS CHD could be chosen; however, due to the remarkable compatibility of natural polymers with the hydroxy-functional polyesters, even a polyester with a relatively modest tensile strength, such as BIS adipic, can be formulated to have substantially improved tensile strength. This will be demonstrated hereinafter by Table 3 of Example 4.

Natural Polymers

Among the natural polymers suitable and preferred for practicing this invention is starch. Starch is a low-cost and abundant natural polymer composed of amylose and amylopectin. Amylose is essentially a linear polymer having a molecular weight in the range of 100,000–500,000, whereas amylopectin is a highly branched polymer having a molecular weight of up to several million. Unmodified, natural starches are obtained in granular form and may be derived from cereals or grains (such as corn, wheat, rice and sorghum), roots (such as cassava), legumes (such as peas), and tubers such as potato and canna. Such starch granules typically have a particle size less than about 50 μm, which is the preferred particle size. While less preferred, flours whose contents are predominately starch, and which may also contain protein, oil and fiber, are operative in the invention. Where such other natural polymers are used, they should be processed so as to be in granular form and preferably will have a relatively uniform particle size of about 50 μm or less. Starches derived from potato and canna are also less preferred for use in this invention due to their relatively large particle size of about 40 μm to about 100 μm.

Starch granules for use in this invention will normally have a water content of less than about 15 wt. %, more preferably less than about 10–11 wt. %. As will be exemplified, granules may be pre-dried to less than about 1% moisture before compounding. Although preferred, pre-drying is not believed necessary.

Derivatized (modified) starches are also suitable for use in this invention. By "derivatized starches" is meant to include starches which have been chemically treated so as to form starch esters, starch ethers, and crosslinked starches. By "modified" is meant that the starch can be derivatized or modified by typical processes known in the art (e.g.

esterification, etherification, oxidation, acid hydrolysis, cross-linking and enzyme conversion). Typically, modified starches include esters, such as the acetate ester of dicarboxylic acids/anhydrides. Particularly useful are the alkenylsuccinic acids, and hydrides, ethers (such as the hydroxyethyl and hydroxypropyl starches), starches oxidized with hypochlorite, starches reacted with cross-linking agents such as phosphorus oxychloride, epichlorhydrin, hydrophobic cationic epoxides, and phosphate derivatives prepared by reaction with sodium or potassium orthophosphate or tripolyphosphate and combinations thereof. These and other conventional modifications of starch are described in publications such as *Starch: Chemistry and Technology*, 2d edition, editor Whistler et al., and *Starch Derivatives: Production and Uses*, Rutenberg et al., Academic Press, Inc. 1984.

For example, starch esters may be prepared using a wide variety of anhydrides, organic acids, acid chlorides, or other esterification reagents. Examples of anhydrides are acetic, propionic, butyric, and so forth. Further, the degree of esterification can vary as desired, such as from one to three per glucosidic unit of the starch, or as appropriate given the number of hydroxyl groups in the monomeric unit of the natural polymer, if selected to be other than starch. Similar or different esterified natural polymers, with varying degrees of esterification, can be blended together for practicing the invention. Although esterified starches are stable to attack by amylases, in the environment the esterified starches are attached by microorganisms secreting esterases which hydrolyze the ester linkage.

Starch esters tend to be hydrophobic in contrast to starch raw materials (that is, derived by usual techniques from natural sources such as corn). Thus, depending upon the particular application, one may prefer to choose an hydrophobic starch ester rather than a hydrophilic starch in formulating compositions of the invention.

Starches are preferred for use as the natural polymers, particularly due to ready availability and low cost, but other suitable natural polymers (in or prepared to be in granular form of a suitable particle size) are hydroxyl containing polymers such as cellulose, hemicellulose, chitin, guar gum, locust bean gum, pectin, xanthan, algin, agar, and dextran. Some of these can play the role of filler, also. Excellent results have been obtained with both granulated guar gum and cellulose powder, as will be exemplified hereinafter.

Optional Components

A plasticizer can be added to inventive compositions to achieve greater material processability and product flexibility, although plasticizers typically soften the compositions in which they are included. This is not always true, however, of compositions of the invention, as will be discussed hereinafter. Molded articles and films prepared from blends including plasticizers preferably use plasticizers that are biodegradable. Examples of biodegradable plasticizers include various esters, such as phthalate esters, and various other biodegradable esters known in the chemical arts.

Inorganic and organic fillers can be added, such as talc, calcium carbonate, diatomaceous earth, and so forth. Biodegradable organic fillers, such as cellulose and other fibers and the like are well known.

Compositions of the invention, as earlier noted, can be processed by various methods such as extrusion, injection molding, and film forming methods. For example, extrusion casting can give translucent, flexible films.

EXPERIMENTAL

Aspects of the invention will now be illustrated, without intending any limitation, by the following examples.

EXAMPLE 1

Inventive embodiments were prepared from premixed batches of starch or derivatized starch and polyester and optionally containing plasticizer or other additives. The starches were pre-dried to less than 1% moisture before compounding. Compounding was then accomplished on a Brabender PL2000 torque rheometer using a mixing screw with a fluted dispersive mixing section and a notched distributive section. Strands from the die were air cooled and pelletized.

The compounded pellets were then injection molded into tensile bars (ASTM D638 Type V) either with a Cincinnati Millicron Model ACT-75B or a Rabit Hy-4 ram-type machine with a single cavity mold. For some compositions tensile bars were stamped from compression molded blanks formed in a Carver Press. Tensile bars were conditioned at 50% RH and 23° C. for one day before testing in order to provide equivalent conditions in comparing one run to another. Selected compositions were also tested after immersion in water for one day.

Tensile tests were performed on an Instron Model 4201 testing system.

As illustrated by the Tables 1–5 and Table 6 data, inventive composition may be made as formed articles. Compositions of the invention are suitable for thermoplastic processing, such as molding, extrusion and casting, in applications where solid articles are desired as well as where thin, stretchable films are desired. A limitation is placed on the starch content (e.g. above about 70 wt. % or 80 wt. %) for processability.

EXAMPLE 2

Embodiments of the invention were prepared as described by Example 1. Four were selected for having a tensile strength above about 20 MPa, as is set out by the data of Table 1. The natural polymer used for all four compositions was corn derived starch granules.

TABLE 1

| Inventive Composition | Wt. % Starch | Wt. % Polymer[a] | Other | Tensile Strength (MPa) |
| --- | --- | --- | --- | --- |
| 1 | 15 | 85 | — | 66.3 |
| 2 | 30 | 70 | — | 39.0 |
| 3 | 45 | 55 | — | 22.0 |
| 4 | 60 | 40 | — | 23.3 |

[a]The hydroxy-functional polyester was BIS CHD.

The inventive composition 1 is remarkable in its tensile strength property when one considers that the tensile strength of 100% BIS CHD polymer is 60–61 MPa. This means the inventive composition with 15 wt. % starch has a tensile strength that is increased with respect to the polyester itself. This is another illustration of the remarkable compatibility between natural polymers, such as the granular starch component, and the hydroxy-functional polyester for compositions of the invention.

Returning to the data of Table 1, although inventive compositions 3 and 4 had only about ⅓ the tensile strength in comparison to a composition with all polyester, nevertheless even the highly starch filled composition had a tensile strength adequate for forming a number of useful articles, such as for example disposable utensils.

EXAMPLE 3

Further embodiments of the invention were prepared as described by Example 1. Nine were selected for having a tensile strength at about 20 MPa or greater. These are set out by the data of Table 2. The granules used as natural polymers for the Table 2 compositions were corn derived starch.

TABLE 2

| Inventive Composition | Wt. % Starch | Wt. % Polymer[a] | Other[b] Wt. % | Tensile Strength (MPa) |
|---|---|---|---|---|
| 11 | 15 | 75 | 10 | 64.5 |
| 12 | 30 | 60 | 10 | 38.9 |
| 13 | 45 | 45 | 10 | 20.6 |
| 14 | 60 | 30 | 10 | 20.2 |
| 15 | 45 | 45 | 10 | 25.2 |
| 16 | 60 | 30 | 10 | 18.0 |
| 7 | 45 | 45 | 10 | 18.3 |
| 8 | 50 | 43 | 7 | 18.8 |
| 9 | 55 | 38 | 7 | 18.6 |

[a]The hydroxy-functional polyester was BIS CHD.
[b]Compositions 11–14 included ESTAFLEX plasticizer (acetyltributylcitrate), compositions 15–16 included PARAPLEX plasticizer (epoxidized soybean oil), compostions 7–9 included either PEG 3350 or PEGC 20M plasticizer (polyethylene glycols).

The data of Table 2 illustrates the uses of various optional components, such as different plasticizers, in compositions of the invention. A comparison of inventive composition 3 from Table 1 with inventive composition 15 of Table 2 illustrates that the use of particular plasticizers can even moderately improve tensile strengths. This is another example of the remarkable compatibility of the two essential components of the invention because plasticizer is normally used to improve processing, but normally softens the composition.

Inventive compositions 16 and 7–9 of Table 2 and inventive compositions 3 and 4 of Table 1 have tensile strength values in the range of about 18–23 MPa. That is, these inventive compositions have better tensile strength than the biodegradable compositions reported by Ramsey, supra, but by contrast to the Ramsey compositions the inventive compositions included between about 45–60 wt. % starch granules (whereas the Ramsey compositions included only about 25 wt. % granular starch).

EXAMPLE 4

Yet more embodiments of the invention were prepared as described by Example 1, and four were selected for having a tensile strength above about 20 MPa, the data for which are set out by Table 3.

TABLE 3

| Inventive Composition | Wt. % Starch | Wt. % Polymer[a] | Other | Tensile Strength (MPa) |
|---|---|---|---|---|
| 28 | 15 | 85 | — | 33.0 |
| 29 | 30 | 70 | — | 46.7 |
| 30 | 45 | 55 | — | 41.8 |
| 31 | 60 | 40 | — | 25.6 |

[a]The hydroxy-functional polyester was BIS Adipic.

The data of Table 3 illustrates inventive compositions with yet another hydroxy-functional polyester. While inventive composition 28 (with 15 wt. % starch) has good tensile strength, it is considerably less than that found with inventive composition 1 where the hydroxy-functional ester was BIS CHD. However, with increased amounts of starch granules (in the range of 30 wt. % to 45 wt. % starch) the tensile strength improved.

FIG. 1 illustrates inventive composition 31. As illustrated, the discontinuous starch granules are well adhered in the continuous polyester phase. By contrast, non-inventive compositions of starch and with various polyesters were found readily to fall apart and when viewed with analogously magnified micrographs to have visible holes where the non-adhered starch granules had fallen out.

EXAMPLE 5

Further embodiments prepared with a particularly preferred hydroxy-functional polyester, BIS DDCA, were prepared and selected for the property of elongation.

TABLE 4

| Inventive Composition | Wt. % Starch | Wt. % Polymer[a] | Other | Elongation (%) |
|---|---|---|---|---|
| 23 | 15 | 85 | — | 679 |
| 24 | 30 | 70 | — | 599 |
| 25 | 45 | 55 | — | 504 |

[a]The hydroxy-functional polyester Was BIS DDCA.

Inventive compositions 23–25 gave outstanding elongation properties. For comparison, for example, the elongation to break (percent) for 100% high density polyethylene is 759. Thus, inventive compositions 23–25 compare quite favorably in elongation to 100% high density polyethylene, yet include up to 45 wt. % in starch granules.

EXAMPLE 6

The data of Table 5 illustrates use of yet another hydroxy-functional polyester for compositions of the invention, where the two inventive compositions have excellent elongation properties.

TABLE 5

| Inventive Composition | Wt. % Starch | Wt. % Polymer[a] | Other | Elongation (%) |
|---|---|---|---|---|
| 19 | 15 | 85 | — | 426 |
| 20 | 30 | 70 | — | 465 |

[a]The hydroxy-functional polyester was HQ DDCA.

FIG. 2 illustrates inventive composition 19. One again sees the remarkable adherency of the granules in the hydroxy-functional polyester. This FIG. 2 micrograph was made after the elongation test had been performed.

EXAMPLE 7

Unlike the preparations of Example 1, embodiments of the invention were prepared where the starch granules were not pre-dried. Instead, starch granules (containing about 10–11 wt. % water) were prepared in a manner analogous to that reported in Example 1 but with no pre-drying step. From reviewing tests performed with these embodiments, we conclude that the pre-drying step, while preferred, does not appear necessary. Alternatively, if desired to remove some moisture from the granules, such could be done during an extrusion step rather than as a separate, pre-drying step.

EXAMPLE 8

The previously described examples 1–6 were compositions that were formed into tensile bars. We turned to using compositions in another form. Thus, thin films having less than about 0.1 mm thickness were prepared with a torque rheometer fitted with a one inch blown film die. The films obtained were conditioned at 23° C. and 50% relative humidity before testing. The data from Table 6 illustrate properties of two different inventive compositions so formed into films.

TABLE 6

| Inventive Composition | Wt. % Starch | Wt. % Polymer[a] | Other[b] | |
|---|---|---|---|---|
| | | | | Elongation (%) |
| 45 | 28 | 66 | 6 | 244 |
| | | | | Tensile Strength (MPa) |
| 44 | 30 | 70 | — | 17.4 |

[a]The hydroxy-functional polyester was BIS Adipic.
[b]Plasticizer was a modified polyethylene glycol.

EXAMPLE 9

Compositions were prepared with other starches or derivatized starches. Thus, diepoxide corn (a reaction product of bisphenol A diglycidyl ether (10%) and corn starch), hydroxyethyl corn, and corn flour were each formulated with BIS Adipic polyesters in amounts of about 40%–50% flour or derivatized starch. However, the Table 3 compositions (using BIS adipic) have to date been found to be preferred to all the flours and derivatized starches tested.

EXAMPLE 10

Another set of tensile bar formed compositions were prepared, but instead of starch, flour or derivatized starch, the natural polymers used were either guar gum or cellulose. Both were in granule form with particle sizes well below 100 μm. The method of preparation for the compositions was the same as described in Example 1. Table 7 summarizes the results.

TABLE 7

| Inventive Composition | Tensile Strength (MPa) |
|---|---|
| 30 wt. % guar gum and 70 wt. % Bis Adipic | 33 |
| 30 wt. % cellulose powder and 70 wt. % Bis Adipic | 37 |

EXAMPLE 11

Starch granules derived from potatoes were also formed into blends with a hydroxy-functional polyester having properties indicated by data gathered and set out by Table 8.

TABLE 8

| | Tensile Strength (MPa) | Elongation (%) |
|---|---|---|
| Control: | | |
| 100% Polyester | 21 | 705 |
| 20% Potato Starch | 12.7 | 370 |
| 40% Potato Starch | 6 | 190 |
| 60% Potato Starch | 7.45 | 14 |

The polyester used in gathering the Table 8 data may be prepared as follows.

A 13 L resin kettle, equipped with a mechanical stirrer and nitrogen inlet, is charged with hydroquinone diglycidyl ether (1312.5 g, 5.8 mol, 113.06 g/equiv. epoxide), 1,10-decanedicarboxylic acid (1343.5 g, 5.83 mol), and tetra-n-butylammonium bromide (94.2 g, 0.29 mol). Diglyme (3 L) is added and the mixture heated to 110° C. for 5.5 hours under an atmosphere of nitrogen. Glacial acetic acid (250 mL) is added and heating at 110° C. is continued overnight. The solution is allowed to cool to about 50° C. and is poured into water in a large Waring blender (300 mL portions into 2 L water). The fibrous precipitate is collected by suction filtration and suspended in fresh water for 3 days. The product is collected by suction filtration and allowed to air-dry overnight. The product is dried in a vacuum oven at 100–115° C. overnight. The polymer has an inherent viscosity of 0.42 dL/g (DMF, 25° C., 0.5 G/DL), a Tg of 5° C., and a Tm of 75° C.

Dry blends of the above polyester and unmodified potato starch are prepared using the weight ratios indicated in Table 8. The blends are compounded using a Haake mixer (60 cc bowl) at 120° C. for 6 minutes as indicated. Plaques (4"×4"×0.0625") are prepared by compression molding the material obtained from the Haake mixer. Specimens for mechanical property testing are obtained from these plaques. Selected tensile properties are listed in Table 8.

It is to be understood that while the invention has been described above in conjunction with preferred specific embodiments, the description and examples are intended to illustrate and not limit the scope of the invention, which is defined by the scope of the appended claims.

It is claimed:

1. A formed article comprising:
   a continuous synthetic polymer phase and granules of natural polymer dispersed therein, the synthetic polymer phase including a hydroxy-flunctional polyester with repeating units represented by Formula B:

FORMULA B

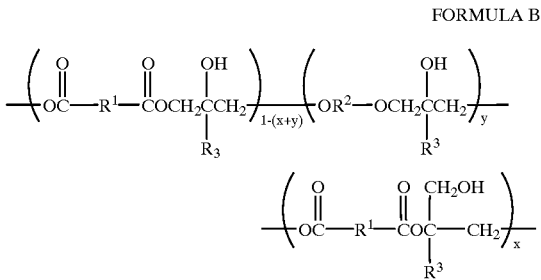

wherein each of $R^1$ and $R^2$ is individually a divalent organic moiety which is predominately hydrocarbon, each $R_3$ is individually hydrogen or lower alkyl, y is a fraction from 0 to 0.5, and x is a fraction from about 0.05 to about 0.4, the natural polymer granules being starch, a starch ester, a starch ether, a cross-linked starch, cellulose, or guar gum.

2. The formed article as in claim 1 wherein the article has a tensile strength above about 20 MPa or a tensile elongation above about 200 percent.

3. The formed article as in claim 1 wherein the natural polymer to polyester is in a weight ratio of up to about 6:1.

4. The formed article as in claim 1 wherein the granules have a particle size of less than about 100 μm.

5. The formed article as in claim 1 wherein the granules have a particle size of less than about 50 μm.

6. The formed article as in claim 1 wherein the granules have a water content of less than about 15 wt. %.

7. The formed article as in claim 1 wherein $R^3$ is individually hydrogen or methyl.

8. The formed article as in claim 1 wherein the natural polymer granules have a particle size of less than about 50 μm and when from a starch, a starch ester, or a starch ether are derived from a grain, a root, a legume, or mixtures thereof.

9. The formed article as in claim 8 wherein the natural polymer constitutes between about 15% to about 75% of the article by weight.

10. The formed article as in claim 1 further including one or more of a processing aid and a plasticizer and a filler.

11. The formed article as in claim 1 wherein the natural polymer constitutes between about 40% and about 75% of the article by weight and the granules have a water content of less than about 11% by weight.

12. The formed article as in claim 1 wherein the natural polymer granules include a corn starch and the corn starch constitutes between about 15% to about 75% of the article by weight.

13. The formed article as in claim 1 wherein the natural polymer granules are substantially evenly dispersed throughout a matrix formed by the synthetic polymer phase.

14. The formed article as in claim 1 wherein the polyester is BIS CHD, whose repeating structure includes Formula C:

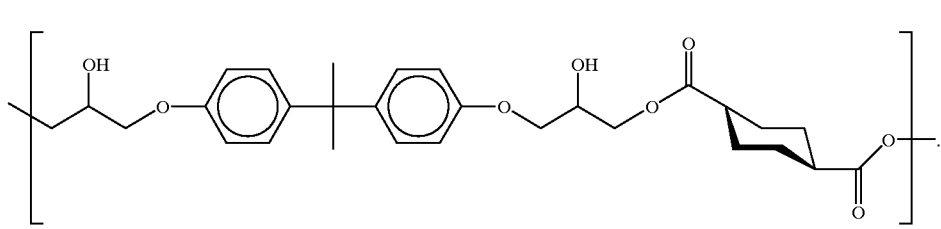

FORMULA C

15. The formed article as in claim 1 wherein the synthetic polymer is BIS adipic, whose repeating structure includes Formula D:

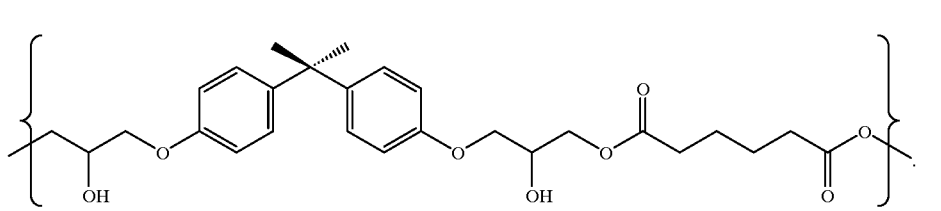

FORMULA D

16. The formed article as in claim 1 wherein the synthetic polymer is HG DDCA, whose repeating structure includes Formula E:

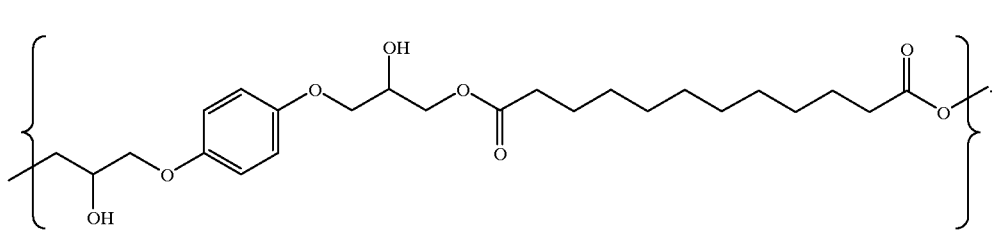

FORMULA E

17. The formed article as in claim 1 wherein the synthetic polymer is BIS DDCA, whose repeating structure includes Formula F:

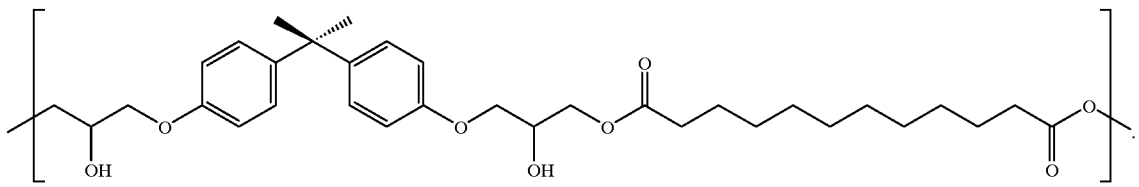

FORMULA F

18. The formed article as in claim 1 wherein each of $R^1$ and $R^2$ is individually a divalent aromatic moiety selected from the group consisting of m-phenylene, p-phenylene, isopropylidene, diphenylene, biphenylene, biphenylene oxide, methylenediphenylene, biphenylene sulfide, naphthylene, biphenylenecyanomethane, 3,3'-dialkyl-diphenytene-isopropylidene, and 3,3',4,4'-tetraalkyldiphenylene-isopropylidene.

19. The formed article as in claim 1 wherein each of $R^1$ and $R^2$ is individually m-phenylene, p-phenylene, and isopropylidene diphenylene.from the group consisting of 20. The formed article as in claim 1 wherein each of $R^1$ and $R^2$ is individually a divalent aliphatic moiety selecteddialkyleneketone, dialklylenesulfone, dialkylenesulfoxide, dialkyleneoxide, and dialkylenesulfide.

21. The formed article as in claim 1 wherein each of $R^1$ and $R^2$ is individually a divalent aliphatic moiety selected from the group consisting of ethylene, propylene, and butylene.

22. The formed article as in claim 1 wherein the forming has been by molding, extrusion, or casting.

* * * * *